April 20, 1943.  P. S. JACKSON  2,316,871
HYDRAULIC MACHINE TOOL
Original Filed April 8, 1937   3 Sheets-Sheet 3
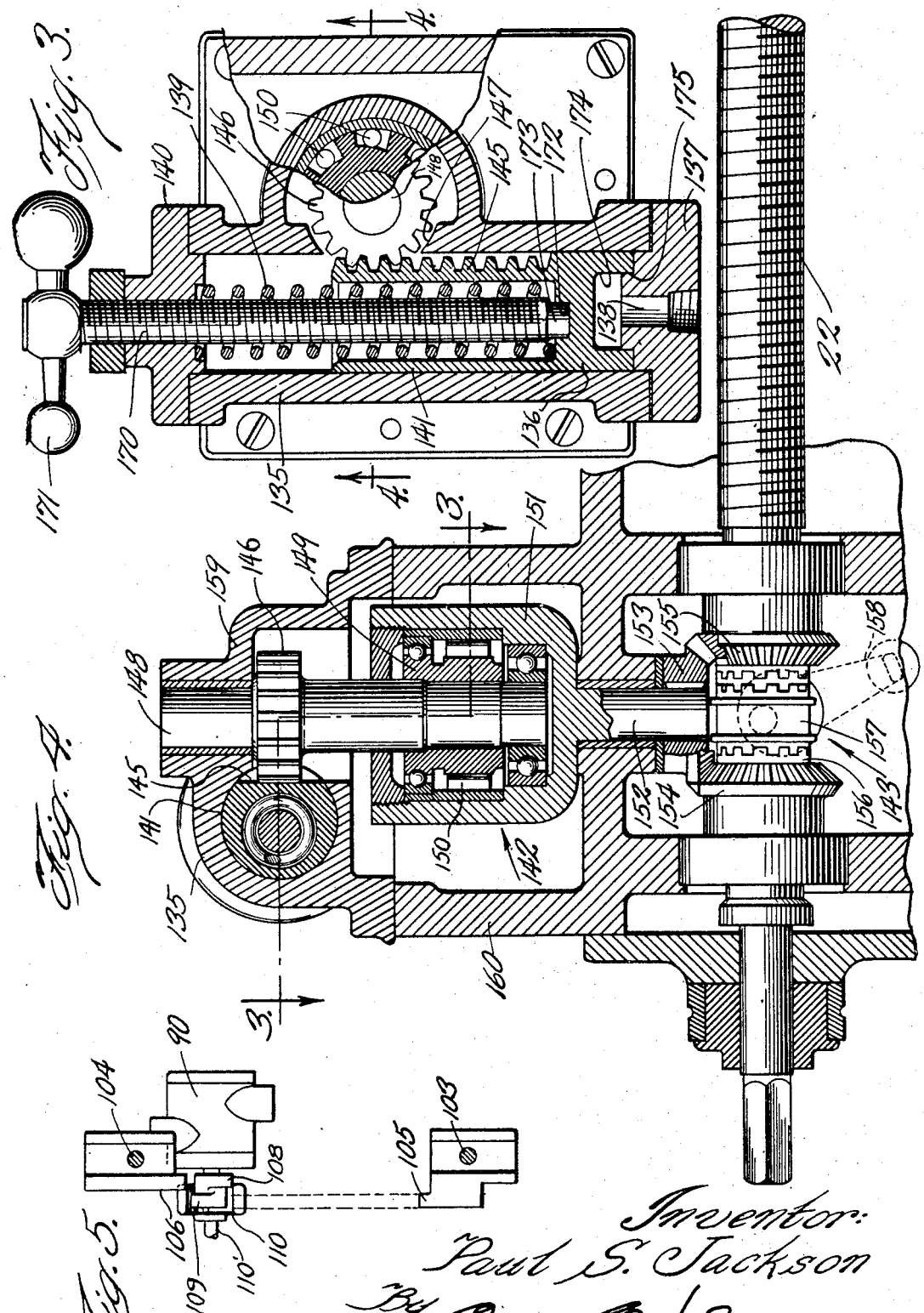
Inventor:
Paul S. Jackson Patented Apr. 20, 1943

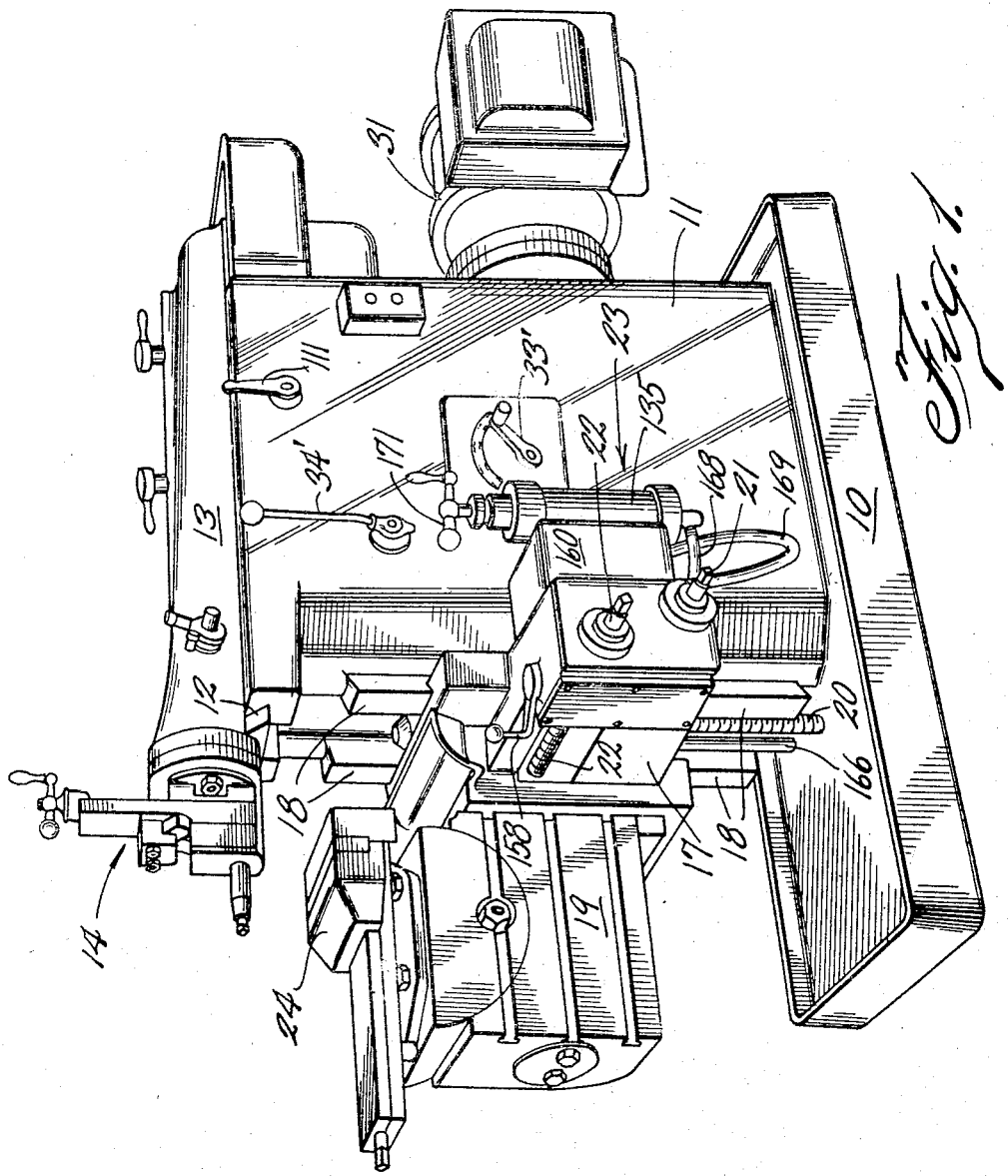

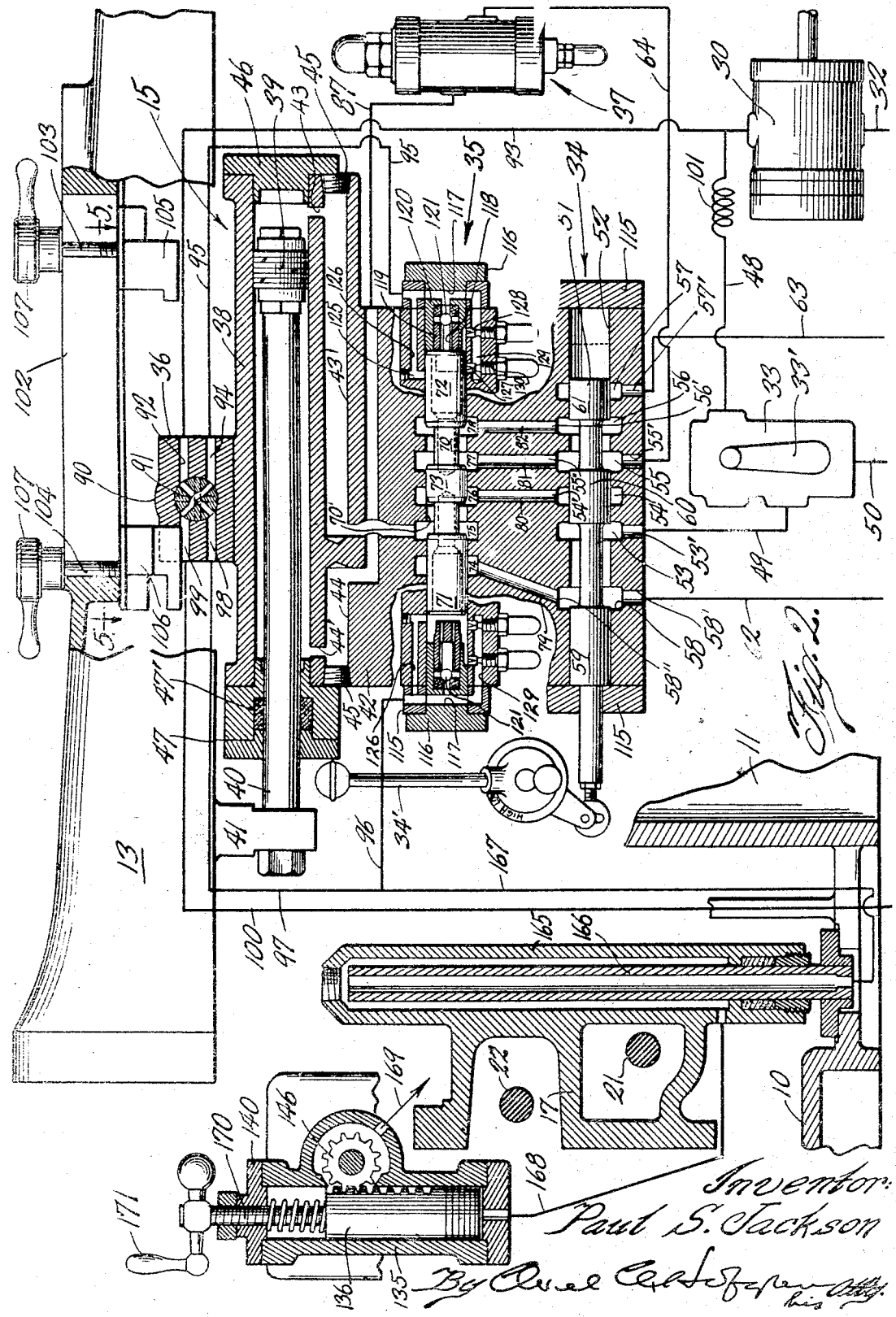

2,316,871

UNITED STATES PATENT OFFICE 2,316,871

HYDRAULIC MACHINE TOOL

Paul S. Jackson, Rockford, Ill., assignor to Rockford Machine Tool Company, Rockford, Ill., a corporation of Illinois Original application April 8, 1937, Serial No. 135,728. Divided and this application October 28, 1939, Serial No. 301,684

9 Claims. (Cl. 90—38)

The invention relates generally to machine tools and particularly to machine tools of the continually reciprocating type, such as, planers, shapers, and the like, and to a hydraulic circuit therefor. This application is a division of my prior application Serial No. 135,728, filed April 8, 1937, now Patent No. 2,223,038 of November 26, 1940.

A general object of the invention is to provide in a machine tool, having a reciprocable member, a hydraulic actuating system having novel and improved valve means and circuit arrangement for controlling the reversal and rate of movement of the reciprocable member of the machine.

A more particular object is to provide such a machine tool with a new and improved hydraulic actuating system operable to drive the reciprocable member at different rates and in different directions in which a single valve controls initiation and arrest of operation and rate of movement.

Another object is to provide a machine tool having a reciprocable member and a hydraulic actuating system for the member including a motor of the piston and cylinder type and control valve means for the system, in which the cylinder of the motor and the casing of the control valve means are cast as a single, integral body.

Yet another object is to locate a pilot valve, controlling the reversing valve of a hydraulic actuating system, in a concealed and protected position wholly within the frame of the machine with which the system is associated in order to protect the pilot valve against injury and to avoid entanglement of an attendant with the valve while making an adjustment thereon during operation of the machine.

Still another object is to provide in a hydraulically actuated machine tool having a reciprocable member, a hydraulically actuated reversing valve constructed and controlled in a novel manner to have a shifting movement of a character assuring a precise and smooth reversal of the reciprocable member.

Still a further object is to perfect a hydraulic shaper which is precise, smooth and quiet in operation, which is designed to avoid injury to its vital parts and to an attendant of the machine, which has a minimum number of controls to simplify operation thereof, and which may be cheaply and economically manufactured.

Other objects and advantages will become apparent from the following detailed description taken in connection with the accompanying drawings, in which:

Fig. 1 is a perspective view of a machine tool embodying the features of this invention.

Fig. 2 is a partially diagrammatic view of the machine shown in Fig. 1 arranged to illustrate the hydraulic circuit of the machine tool.

Fig. 3 is an enlarged sectional view of the feed motor for the work support, taken along line 3—3 of Fig. 4.

Fig. 4 is a sectional view of the driving connection from the feed motor to the work support, taken along line 4—4 of Fig. 3.

Fig. 5 is a fragmentary plan section taken along the line 5—5 of Fig. 2.

While the invention is susceptible of various modifications and alternative constructions, it is here shown and will be described hereinafter in a preferred embodiment, but it is not intended that the invention is thereby to be limited to the specific construction disclosed, but it is intended to cover all modifications and alternative constructions falling within the spirit and scope of the invention as defined by the appended claims.

For purposes of disclosure, the invention, while relating generally to hydraulic machine tools having a first reciprocable carriage and a second carriage intermittently fed transversely of the path of the first carriage and in timed relation with the reciprocations thereof, one of the carriages supporting a tool and the other a work piece, is here shown and will be described hereinafter as embodied in a shaper. As here shown, such a shaper has an elongated base 10 with a column 11 upstanding from the rear of the base and housing the major portion of the operating mechanism. Reciprocable longitudinally of the base in ways 12 formed on the top of the column is a carriage or ram 13 equipped at its forward end with conventional mechanism 14 for adjustably supporting a tool (not shown). The ram 13 has a forward cutting or feed stroke and a rearward traverse or return stroke and is reciprocable by a hydraulic motor (Fig. 2) generally designated 15, the motor being operable to drive the ram forwardly at either one of two cutting or feed speeds and to return the ram at rapid traverse speed.

Located at the front of the machine is the work supporting unit comprising a rail 17 mounted for vertical sliding movement on ways 18 formed on the front face of the column 11 and a table 19 supported on the rail 17 for movement transversely of the base and of the path of reciprocation of the ram 13. The rail 17 is adjusted vertically to position the work at the proper elevation with respect to the tool by means of the well known screw and nut arrangement. Herein a vertically disposed screw 20 is fixed at its lower end in the base 10 while a nut threadedly engaging therewith is rotatably mounted in the rail and may be actuated by manual rotation of a lead screw 21 projecting from the right end of the rail. Movement of the table 19 in either direction transversely of the path of reciprocation of the ram 13 may be imparted manually by rotation of a lead screw 22 and is imparted automatically in timed relation with the reciprocation of the ram by a hydraulic motor generally designated 23. The table 19 preferably carries a vise 24 in which the work piece is clamped and which in the present instance is mounted for tilting in the longitudinal plane of the machine.

Operating fluid, oil being commonly employed, is supplied to the various motors by a pump 30 of the constant displacement type (see Fig. 2) located within the column 11 and driven at a constant speed by an electric motor 31 mounted on the rear of the column. The pump 30 draws fluid from a reservoir, in the bottom of the column, (not shown) through a pipe 32 and discharges the fluid through a common connection into a main actuating circuit and into an auxiliary feed and control circuit. The fluid in the circuits is controlled to obtain the movements of the various parts as above described by manually and automatically operable valves including a combined volume control and relief valve 33, a combined rate selector and start-stop valve 34, a reversing valve 35, a pilot valve 36, and a back pressure and check valve 37. By means of these valves, as will more particularly be described hereinafter, the shaper may be started manually, after which the ram will be continuously reciprocated with the return stroke at a rapid traverse rate and the forward stroke at the selected one of two feed rates. The work support will be fed transversely intermittently in timed relation with the reciprocation of the ram, with the operation of the shaper continuing in this manner until manually arrested.

Referring particularly to Fig. 2, the hydraulic motor 15 comprises a cylinder 38 disposed longitudinally of the shaper immediately below the ram 13 and a piston 39 reciprocable within the cylinder. A piston rod 40 projects through the forward end of the cylinder 38 and is connected at that end to a depending bracket 41 on the ram 13. The piston rod 40 is of large diameter, not a great deal smaller than the piston 39, in order that the return stroke of the ram may be effected at a rapid traverse rate without changing the volume of discharge of the pump, as is well known to those skilled in the art. The cylinder 38 is formed as an integral part of a large integral casting 42 mounted within the column 11 and which in addition forms the housings or casings of the start-stop valve 34 and the reversing valve 35. Also formed in the casting, to eliminate the necessity of external piping and conduits, are suitable passages or ducts including a passage 43 communicating with the head end of cylinder 38 through a port 43′ and a passage 44 communicating with the rod end of the cylinder through a port 44′. The passages are conveniently formed in part by drilling with the ends of the passages closed by threaded plugs 45. The rear or head end of the cylinder 38 is closed by a cap 46, while the forward or rod end is closed by an annular, two part member 47 containing suitable packing 47′ for sealing the cylinder against leakage of fluid outwardly along the piston rod. Annular flanges on the cap 46 and the member 47 overlie the plugs 45 to aid in retaining the same in the passages.

As previously stated, operating fluid is supplied to the hydraulic motors of the shaper by the pump 30 under the control of a plurality of manually and automatically actuated valves 33, 34, 35, 36 and 37. Of these valves, the valve 33, as stated, is a combined volume control and relief valve and is of well known and standard commercial construction. The valve receives fluid from the pump 30 through a conduit 48 and discharges a predetermined proportion of the fluid so received through a conduit 49 leading to the start-stop and rate selector valve 34. The volume of fluid discharged by the valve 33 to the conduit 49 may be the total displacement of the pump 30 or may be any fraction thereof, as determined by the adjustment of a handle 33′ of the valve. Any excess of fluid supplied by the pump above the volume for which the valve 33 has been adjusted is returned to the reservoir through a conduit 50. While the valve 33 is located within the column 11, the handle 33′ is located externally of the column on the right side of the shaper (see Fig. 1) where it is readily accessible for adjusting the valve. It is believed apparent from the foregoing that the valve 33 by controlling the volume of fluid supplied serves as a basic control for the rate of movement of the ram 13 on both its cutting and its return stroke.

Valve 34, as stated, is a combined start-stop and rate selector valve and as such governs the initiation and arrest of operation of the ram and the feed rate of movement thereof. Its rate selector function is superimposed upon that of the valve 33 to direct the fluid supplied by the valve 33 in a manner to obtain either one of two speed ranges during a cutting stroke of the ram, the actual speed within each range being determined by the volume of fluid discharged by the valve 33. Valve 34 has three positions, namely, "stop," "low," and "high" and is actuated manually through a handle 34′ disposed outwardly of the column 11 on the right side thereof. In its "stop" position, namely, that shown in Fig. 2, the valve returns to the reservoir the fluid supplied by the valve 33 so that no fluid is supplied to the motor 15. When shifted to its "low" position, namely, the dotted line position shown in Fig. 2, the valve directs operating fluid to one end only of the cylinder 38 depending upon the setting of the reversing valve 35, while permitting the fluid in the other end to discharge to the reservoir. A low speed range is then obtained because the entire volume of operating fluid is supplied by the pump 30. However, when the valve is shifted to its "high" position, namely, the extreme right position as viewed in Fig. 2, it still directs fluid to one end only of the cylinder when the reversing valve is shifted to effect a return stroke of the ram but connects groove 53 to both ends of the cylinder 38 when the reversing valve is shifted to effect a forward or cutting stroke of the ram. A high speed range is thus obtained because of the differential piston face areas.

In order to obtain such control of the fluid, the valve 34 comprises a core 51 slidable in a bore 52 in the casting 42 constituting the valve casing. Formed in the casing and communicating with the bore are five annular grooves 53, 54, 55, 56, and 57, equally spaced axially but shifted slightly from the middle of the bore, and a sixth annular groove 58 spaced from the groove 53 approximately twice the normal spacing of the grooves. Opening into each of the grooves 53, 54, 56, and 57 is a single port 53', 54', 46', and 57', respectively, while opening in grooves 58 and 55 are ports 58' and 58" and 55' and 55" respectively. The valve core 51 in turn is formed with progressively shorter lands 59, 60 and 61, with the land 59 spaced from the land 60 a distance sufficient to embrace both the groove 53 and the groove 58 when the valve is in "stop" position, and with the land 61 spaced from the land 60 a distance sufficient to embrace grooves 55 and 56. Thus, with the valve in "stop" position, as shown in Fig. 2, fluid from the conduit 49 enters the groove 53 and flows along the bore 52 to the groove 58 from which it is returned to the reservoir through port 58' and a conduit 62. With the valve shifted to its "low" position, that is, the dotted line position shown in Fig. 2, the groove 53 is now cut off from the groove 58 by means of the land 59, but is in communication with groove 54 while groove 56 is in communication with groove 57 discharging to the reservoir through a conduit 63. When the valve is shifted to its "high" position, that is, the extreme right position, groove 53 is still cut off from the groove 58, but is now in communication with both grooves 54 and 55, while groove 56 is no longer in communication with groove 57. Groove 55 through port 55' is connected by a conduit 64 to the back pressure and check valve 37.

Valve 35, as previously stated, is a reversing valve having two positions, namely, a "forward" position as shown in Fig. 2, and a "return" position which it assumes when shifted to the left as viewed in Fig. 2 for alternately directing fluid to opposite ends of the cylinder 38. The valve comprises a core 70, having similar end lands 71 and 72 and an intermediate land 73 spaced an equal distance from each end land, shiftable within a bore 70' formed in the casting 42 constituting the valve casing. The bore communicates with five ports here formed as annular grooves 74, 75, 76, 77, and 78 all equally spaced axially. The left hand groove 74 communicates by means of a passage 79 and port 58" with the groove 58 of the valve 34, and grooves 76, 77, and 78 communicate respectively through passages 80, 81, and 82 with the grooves 54, 55, and 56, passage 81 communicating with groove 55 through port 55". Groove 75, however, communicates with the passage 43 leading directly to the head end of the cylinder 38. The rod end of the cylinder through the passage 44 and a conduit 87 connects to the combined back pressure and check valve 37, thus completing the main actuating circuit. It will be noted that fluid supplied to the rod end of cylinder 38 flows through valve 37 in a direction from conduit 64 to conduit 87 and that fluid discharged from the rod end flows in the opposite direction through the valve.

The combined back pressure and check valve 37 is of well known and commercial construction. It operates to permit substantially free flow in a direction from conduit 64 to conduit 87 but yieldably opposes flow therethrough in the opposite direction. By yieldably opposing flow from conduit 87 to conduit 64, it creates a back pressure in the rod end of cylinder 38 during a cutting stroke and thus tends to smooth out the stroke of the ram should the cut of the tool afford an uneven resistance.

Reversing valve 35 is hydraulically shifted automatically under the control of the pilot valve 36 which governs the auxiliary feed and control circuit above mentioned. The pilot valve (see Figs. 2 and 5) comprises an elongated casing 90 having a core 91 rotatable in a bore formed therein. At one end of the casing 90 near the top thereof is an intake port 92 supplied with operating fluid from the pump 30 through a conduit 93. Disposed vertically below the port 92 is a port 94 communicating through a conduit 95 with one end of the bore 70' of the reversing valve 35. The other end of the bore of the reversing valve is connected by means of conduits 96 and 97 with a port 98 formed in the pilot valve casing 90 at the end opposite the ports 92 and 94. Disposed vertically above the port 98 is a port 99 communicating with a conduit 100 discharging to the reservoir.

The valve core 91 is suitably passaged so that in the position shown in Fig. 2, fluid from pump 30 enters at port 92 and leaves at port 98 to flow through conduits 97 and 96 to the left end of the reversing valve 35, thereby shifting it to the right extreme position shown. Fluid forced out of the right end of the valve 35 flows through conduit 95, port 94 to port 99 and thence through conduit 100 to the reservoir. By rotating valve core 91 through 45° in a counterclockwise direction, as viewed in Fig. 2, port 92 is connected with port 94 and port 98 is connected with port 99, thereby directing the operating fluid to the right end of the reversing valve 35 for effecting a shift to the left and permitting the fluid forced from the left end of the valve to discharge to the reservoir.

Interposed in the conduit 48 of the main actuating circuit is a choke or resistance 101 which serves to maintain a pressure of approximately 100 pounds in the conduit 93. In that manner, operation of the devices supplied by the auxiliary circuit is assured regardless of the pressure which may exist in the main actuating circuit. Furthermore, by the location of ports 92 and 94 at one end of the valve casing 90 and the location of ports 98 and 99 at the other end of the valve casing with the core suitably passaged to connect the ports as described, the change in connection of the ports may be effected by only a 45° rotation of the valve core and still maintain the valve in hydraulic balance.

The pilot valve 36 is automatically actuated in timed relation with the reciprocations of the ram 13 and herein is located where it will be protected and where an attendant of the shaper may adjust the means actuating the pilot valve without danger of being injured. To that end, the valve 36 is mounted within the shaper, specifically, on top of the cylinder 38 transversely thereof and projecting upwardly through ways 12 and partially into the ram 13 which customarily is hollow. The ram is formed in its top surface with an elongated recess 102 in which are adjustably secured pilot valve actuating means 103 and 104. At the lower end of each means, within the ram 13, is a dog 105 and a dog 106, respectively, while at the top of each means is a handle 107 for the adjusting of the means longitudinally of the ram and for the clamping of the means in adjusted position.

As best seen in Fig. 5, the dogs 105 and 106 are offset from one another laterally in order to engage fingers 108 and 109 also offset laterally and fixed with the valve core so as to rotate the same upon engagement of a dog with one of the fingers. With this arrangement, one dog will not interfere with the control of the other dog should the ram overrun its normal stroke. Extending downwardly from the fingers 108 and 109 is a third finger, not shown, which lies between the ends of a forked member 110 fixed on one end of a shaft 110', the other end of which carries a handle 111 disposed outwardly of the column 11. The forked member 110 is made of such width that the finger disposed therein is free to move under the control of the dogs 105 and 106 without actuating the handle 111, while the pilot valve may be controlled manually through actuation of the handle 111.

Smooth operation of a shaper, particularly a reversal of the direction of ram movement without shock, is in large part dependent upon the construction of the reversing valve and the rate at which its shift from one position to another takes place. To that end, means is herein provided for enabling an extremely nice control of the shifting movement of the reversing valve core. This means functions to permit a rapid movement during approximately the first third of the shift of the valve core, a somewhat retarded movement during approximately the next third of the shift, and a still further retarded movement during the last third of the shift. To that end, a plurality of passages are provided for the supply and discharge of fluid to the ends of th bore 70' of the valve 35. In order to show these passages in Fig. 2, a portion of the casting 42 has been rotated through 90°.

Secured, as by bolting, to each end of the casting 42 is a plate 115 for closing the ends of the bores 52 and 70' of the valve 34 and valve 35 respectively. Opposite the ends of valve 35, each plate additionally carries a plug 116 and is formed with a passage 117 communicating with the conduits 95 and 96, leading to the pilot valve, and having three short branches forming parts of the plurality of passages leading to the bore 70' of the reversing valve. The intermediate one of the short branches communicates with a passage 118 opening through an annular member 119 secured in a sleeve 120 forced into the end of the bore 70'. This passage 118 constitutes a supply passages and is controlled by a ball check valve 121 functioning to permit substantially unrestricted flow from the conduit 95 into the end of the bore 70' by seating to prevent any discharge through the passage 118.

Discharge of fluid from the end of the bore 70' takes place through any one of three ports which are successively closed in the order of their size by the end land of the valve core 70 as it is shifted. To that end, there is formed in the casting 42 opening into the bore 70' an uncontrolled port 125 communicating with the passage 117 through a passage 126. This port is disposed to be closed by the end land when the valve core 70 has moved through approximately one-third of its stroke. Ports 127 and 128 communicate by means of a passage 129 with the passage 117 and are controlled by screw plugs 130 with the portion of the plugs projecting into the ports formed with V grooves so that a very nice adjustment of port opening may be obtained by threading the plugs into or out of the port. The casing at the ports 127 and 128 is made flat so that the angular position of the plugs will not vary the opening of the V grooves. Port 127 is so positioned as to be closed by the end land of the valve at the end of the second third of movement of the valve core, while the port 128 is never closed but has complete control of the discharged fluid through the last third of the movement of the valve core. In order further to cushion the final movement of the valve core 70, the lands 71 and 72 are bored to receive slidably within them a portion of the member 119 extending beyond the sleeve 120. The sleeve is formed with a longitudinal groove providing communication between the port 128 and the end of the bore 70'. Also of importance in assuring and obtaining smooth operation of the ram is the shape of the lands on the valve core 70, the edges of which are herein beveled and, moreover, are beveled at an angle which is calculated to coordinate with the control of the valve obtained by the plurality of ports described.

Included in the feed and control circuit is the hydraulic motor 23 for intermittently rotating the screw 22 and thereby intermittently feeding the table 19 transversely in timed relation with the reciprocation of the ram 13 to present new portions of the work to the tool. Herein the motor 23 is of such construction that but a single conduit for operating fluid need be connected thereto. The motor comprises a cylinder 135 and a piston 136 reciprocable therein. One end of the cylinder is closed by a cap 137 having a port 138 therein, through which operating fluid is supplied to impart a forward or working stroke to the piston 136. The piston is given a return stroke by a compression spring 139 at its upper end abutting a cap 140 closing the top of the cylinder and at its lower end received within a sleeve extension 141 of the piston 136.

The reciprocatory movement of the piston 136 is translated into rotary movement of the screw 22 by means of a one-way or overrunning clutch generally designated 142 (see Fig. 4) and a manually controlled reversing clutch generally designated 143. To that end, there is formed on the sleeve extension 141 a rack 145, the teeth of which mesh with a pinion 146 projecting through an aperture 147 in the cylinder 135 and fast on a shaft 148. Also fast on the shaft 148 is an internal member 149 of the overrunning clutch 142 which functions through rollers 150 in well known manner to drive an external member 151 when rotated as an incident to a working stroke of the piston 136 but revolving freely within the member 151 during a return stroke of the piston 136. The external member 151 has integral therewith a shaft 152 which is journaled in the rail 17 and which has keyed thereto a bevel gear 153. Bevel gear 153 meshes in well known manner with a bevel gear 154 and a bevel gear 155, both formed with clutch teeth 156 and freely rotatable upon a portion of the screw 22. Positioned between the bevel gears 154 and 155 and keyed to the screw 22 for rotation therewith is a shiftable clutch element 157 manually actuated by a lever 158 for engagement with either gear 154 or gear 155 to determine the direction of rotation of the screw 22 and hence the direction of feed of the table 19. The cylinder 135 and a housing 159, for the pinion 146, formed integral therewith are secured to a portion 160 of the rail 17 forming a housing for the one-way clutch 142 and thus the entire unit moves with the rail 17 when it is adjusted vertically.

Means is provided herein for obviating the necessity of a flexible connection to the motor 23. To that end, the rail 17 is formed with a cylinder 165 which is closed at its upper end and at its lower end receives telescopically within it an upstanding tube 166 fixed in the base 10 of the shaper. The tube 166 is connected by a conduit 167 with the conduit 97 leading from the pilot valve to the left end of the reversing valve 35. Cylinder 165 in turn is connected by means of a rigid conduit 168 with the port 138 of the cylinder 135. Any fluid leaking past the piston 136 is returned to the reservoir through a flexible conduit 169.

In order to vary the extent of feed of the table 19, the stroke of the piston 136 is made adjustable. To that end, there is threaded through the cap 140 a screw 170 rotatable by means of handle 171. The position of the screw 170 by abutment with the piston 136 determines the length of the working stroke thereof and consequently the extent of feed movement of the table 19. To assure quiet operation of the motor 23, the face of the piston within the sleeve extension 141 is formed with a recess 172 and the end of the screw 170 is reduced at 173 so as to fit within the recess 172 and thereby form a dashpot for quietly stopping the piston at the end of its working stroke. Similarly, the working face of the piston is formed with a recess 174 and the cap 137 is formed with a reduced portion 175 receivable within the recess 174 again to form a dashpot for effecting a quiet arrest of the piston at the end of its return stroke.

The operation of the shaper briefly is as follows: let it be assumed that a work piece has been clamped in the vice 24, that the rail 17 has been elevated to place the work at a proper level with respect to the tool, that the dogs 105 and 106 have been properly adjusted to produce the desired stroke of the ram 13, and that the valve 33 by manipulation of a handle 33' has been adjusted to discharge a volume of fluid to produce the desired feed rate of movement of the ram during its cutting stroke. With the handle 34' in stop position, the attendant would then start the electric motor 31 to initiate operation of the pump 30. So long as the handle 34' is in stop position, fluid discharged by the pump 30 and by the valve 33 directed to the valve 34 is returned through conduit 62 to the reservoir, for in stop position grooves 53 and 58 of the valve 34 are in communication.

To initiate reciprocation of the ram 13, the handle 34' is shifted counterclockwise as viewed in Figs. 1 and 2 to its "low" position, thereby shifting the valve core 51 to its intermediate or dotted line position of Fig. 2. Fluid supplied through the conduit 49 would now flow from the groove 53 to the groove 54 which has been placed in communication with the groove 53 by the shift of the valve core and because the groove 58 is now cut off by the land 59. From groove 54, the fluid would flow through the passage 80 to the groove 76 and assuming that the reversing valve is in the "forward" position shown, the fluid would pass along the bore 70' to the groove 75 and thence through passage 43 to the head end of the cylinder, and would thus impart a forward cutting stroke to the ram. The fluid in the rod end of the cylinder 38 would be forced outwardly through the passage 44, conduit 87, valve 37, conduit 64, groove 55 of valve 34, passage 81, grooves 77 and 78 of the reversing valve 35, passage 82 and grooves 56 and 57 of the valve 34 and out through conduit 63 leading to the reservoir. It is to be noted that with the valve 34 in its "low" position, only the fluid supplied by the valve 33 is discharged to the head end of the cylinder, while the fluid from the rod end is discharged to the reservoir through the valve 37, which creates a back pressure tending to prevent overrunning of the ram or irregular movement thereof, should the resistance created by the cut of the tool be a variable one.

As the ram reaches the end of its forward or cutting stroke, dog 105 engages finger 109 thereby rotating valve core 91 through 45° and connecting the auxiliary control circuit so as to supply fluid to the right end of the reversing valve 35 for the purpose of shifting the same to its left or "return" position. The flow of fluid is from the pump 30 through conduit 93, port 92, to port 94, thence through conduit 95, passage 117 and past check valve 121 through passage 118 to the right end of the bore 70'. There is thus an unrestricted flow of fluid to the right end of the valve 35, and during approximately the first third of its movement a substantially unrestricted discharge from the left end of the valve through port 125, passage 126, to conduit 96 and thence through conduit 97, ports 98 and 99 of the pilot valve and conduit 100 to the reservoir. At the end of the first third of the movement of the core 70, the land 71 closes the port 125 thereby compelling the fluid to be discharged through controlled port 127 which is adjustable to effect a desired restriction of the discharge for retarding the rate of shifting movement of the valve core 70. At the end of the second third of movement of the core 70, port 127 also is cut off by the land 71 compelling the remainder of the fluid to be discharged through the port 128 which also is controlled and further restricts the discharge of fluid. The final movement of the core 70 is controlled by the dashpot effect resulting from the cooperation between the member 119 and the bore in the end of the land 71. This control of the movement of the valve core 70 combined with the beveling of the edges of the lands of the core 70 produces extremely smooth reversal of the ram 13.

With the reversing valve 35 in its left hand or "return" position, fluid now flows through conduit 49, grooves 53 and 54, passage 80, grooves 76 and 77 of the reversing valve, passage 81, groove 55, conduit 64, through valve 37, which does not restrict the flow when in this direction, conduit 87 and passage 44 to the rod end of the cylinder 38 to drive the ram 13 on its return stroke. As is well known to those skilled in the art, with the rod 40 but very slightly smaller in diameter than the piston 39, the return stroke of the ram 13 will be at a rapid traverse rate even though the quantity of fluid supplied is the same as that supplied to the head end during a cutting stroke. Fluid in the head end of the cylinder 38 is discharged through passage 43, grooves 75 and 74 of the reversing valve, passage 79, groove 58 of valve 34, and conduit 62 leading to the reservoir. As the ram reaches the end of its return stroke, dog 106 engages finger 108 and rotates valve core 91 through 45° in a clockwise direction to the position shown in Fig. 2. In this position, fluid is supplied through conduit 93, ports 92 and 98 and conduits 97 and 96 to the left end of the valve 35, thereby shifting the same toward the right to its "forward" position shown in Fig. 2. The fluid in the right end of the valve 35 is discharged in controlled stages the same as was described for the discharge from the left end of the valve.

A shift of the pilot valve 36 to a position directing fluid to the valve 35 to shift the same to its "forward" position also supplies fluid through conduit 167, tube 166, cylinder 165 and conduit 168 to the cylinder 135 of the table feed motor 23. As a result, the piston 136 of the motor is driven through a working stroke, thereby feeding the table 19 transversely to present a fresh portion of the work piece to the tool. This shift of the table 19 transversely takes place substantially simultaneously with the shifting of the reversing valve, but its complete shift prior to movement of the ram upon a forward stroke is assured both because of the retarded shift of the reversing valve and because of the back pressure valve 37. With the shift of the table 19 completed and with the valve core 70 in its "forward" position as shown in Fig. 2, the ram 13 is again driven on a forward or cutting stroke. This reciprocation is continued until the operation of the machine is arrested manually.

The pilot valve 36 may be shifted manually by the handle 111 as well as by the dogs 105 and 106. When the pilot valve is shifted manually, operation of the reversing valve is assured regardless of the pressure in the main actuating circuit because the choke 101 maintains a predetermined minimum pressure in the pilot valve circuit.

When the nature of the cut being taken is such that a higher feed rate of movement of the ram 13 is desirable, the attendant shifts the handle 34' still further in a counterclockwise direction placing the valve 34 in its "high" position, which is the extreme right position in Fig. 2. With the valve in that position, groove 53 is now in communication with both grooves 54 and 55, while groove 56 is blocked off from groove 57 by land 60. As a result, groove 53 is in communication with both the head and the rod end of the cylinder 38, and discharge to the reservoir through conduit 63 is prevented. Due to the differential in the areas of the piston faces, the ram is still driven on a forward stroke with the fluid in the rod end of the cylinder 38 added to the fluid supplied through conduit 49 to impart a high rate of movement to the ram. The supply of fluid to the rod end and the discharge of fluid from the head end of the cylinder during a return stroke of the ram is the same for this position of the valve 34 as it is when the valve is in "low" position.

It is believed apparent from the foregoing that I have perfected a hydraulic shaper having many new and advantageous features, including an improved circuit enabling initiation and arrest of operation as well as rate selection to be governed by a single valve. Moreover, the shaper is rendered more free from interruptions in its use because the vital parts of the machine, such as the pilot valve, are housed within the frame where they will not be subject to injury and where, moreover, the dogs for controlling the same may be adjusted by an attendant during operation of the shaper without danger of injury. Smoothness and quietness in operation are assured by the novel and improved construction of the reversing valve and of the feed motor 23, and economy in manufacture is assured by the forming of the cylinder 38 and housings for the reversing valve 35 and the valve 34 as a single integral casting.

I claim as my invention:

1. A hydraulic shaper comprising, in combination, a base, a column upstanding from the base and terminating at its upper end in horizontally disposed ways extending longitudinally of the base, a ram mounted for reciprocation in said ways, said ram having an elongated recess opening through the bottom thereof, a hydraulic actuating system for reciprocating said ram including a hydraulic motor operatively associated with the ram and a hydraulically controlled reversing valve for alternately reversing the flow of fluid to the motor, a pilot valve controlling said reversing valve, said pilot valve being mounted within the column at the top thereof and extending into the recess in said ram, and a plurality of dogs for actuating said pilot valve secured within the recess in said ram.

2. A hydraulic shaper comprising, in combination, a base, a column upstanding from the base and terminating at its upper end in horizontally disposed ways extending longitudinally of the base, a hollow ram mounted for reciprocation in said ways, a hydraulic actuating system for reciprocating said ram including a hydraulic motor of the piston and cylinder type operatively associated with the ram and a hydraulically controlled reversing valve for alternately directing fluid to opposite ends of the motor, said hydraulic motor and said reversing valve being housed within the frame of the machine with the motor disposed immediately below the ram, a pilot valve mounted on said motor to be wholly concealed by said frame and said ram, and a plurality of dogs for actuating said pilot valve disposed within the ram and adjustably secured for variable positioning longitudinally of the ram by means disposed outwardly of the ram.

3. A machine tool comprising, in combination, a frame, a member reciprocably mounted on said frame, a hydraulic motor, having a casing, operatively associated with said reciprocable member for driving the same, and a fluid supply system for said motor including control valve means having a casing, said motor casing and said valve means casing being cast as a single integral member.

4. A machine tool comprising, in combination, a frame, a member reciprocably mounted on said frame, a hydraulic motor, having a casing, operatively associated with said reciprocable member for driving the same, and a fluid supply system for said motor including a plurality of control valves, said motor casing and said valve casings being cast as a single integral member, and passages in the member interconnecting said valves and said motor.

5. A hydraulic shaper comprising, in combination, an elongated base, a column mounted on said base and upstanding therefrom, a ram mounted on said column for horizontal reciprocation longitudinally of said base, a hydraulic motor for reciprocating said ram comprising a fixed cylinder and a piston reciprocable within said cylinder and secured to said ram, a hydraulic system for supplying operating fluid to said hydraulic motor, including a reversing valve and a manual control valve, said valve casings and said cylinder being cast as a single, integral member and supported within said frame.

6. In a hydraulic machine tool having a frame and a carriage reciprocably mounted on the frame, an integral casting mounted within the frame, a first bore in said casting forming a motor cylinder, a piston reciprocable in said bore and connected to the carriage to drive the same, a second and a third bore formed in said casting, a valve core reciprocable in each said second and third bores to form valves therewith, and passages in said casting interconnecting said valves and said cylinder.

7. A machine tool comprising, in combination, a frame, a support reciprocably mounted on said frame, a hydraulic motor for reciprocating said support, a rail adjustably mounted on said frame, a support slidably mounted on said rail, a hydraulic motor for actuating said last named support, one of said supports being a tool support and the other a work support, a hydraulic valve system for supplying operating fluid to said hydraulic motors to impart continuous reciprocatory movement to one of said supports and intermittent movement to the other of said supports, said system including but a single conduit leading to the motor associated with the intermittently actuated support.

8. In a hydraulically actuated machine tool, a hydraulic fluid supply system including a reversing valve comprising a casing, a valve core within said casing and shiftable hydraulically to two extreme positions, each end of said casing having a check valve controlled supply port, a first, unrestricted return port permitting a substantially unrestricted flow of exhaust fluid during the initial portion of the shift of said valve core, a second variable and restricted port adapted for the discharge of the exhaust fluid during the intermediate portion of the shift, and a third adjustable and restricted port for the discharge of exhaust fluid during the final portion of the shift, said first and said second ports being successively closed as an incident to the shift of said valve core.

9. In a machine tool having a carriage, a hydraulic motor for reciprocating said carriage, and a hydraulically controlled reversing valve directing the supply of fluid to said motor, a pilot valve governing the supply of fluid for shifting said reversing valve comprising a casing having a plurality of ports, a cylindrical core oscillatable within said casing variously to control the ports in the casing, a plurality of fingers fixed with said core to oscillate therewith and offset axially, and a plurality of dog means mounted on said carriage positioned so that each engages one of said fingers after a predetermined movement of said carriage relative to said pilot valve, said dog means also being offset laterally with respect to the path of movement thereof.

PAUL S. JACKSON.